United States Patent [19]
Cucci

[11] Patent Number: 5,788,787
[45] Date of Patent: Aug. 4, 1998

[54] PORTABLE TIRE AIR VALVE EXTENDER FOR USE WITH STACKED WHEEL SETS

[76] Inventor: Charles Cucci, 426 Walnut St., Port Monmouth, N.J. 07758

[21] Appl. No.: 807,579

[22] Filed: Feb. 27, 1997

[51] Int. Cl.$^6$ ................................................. B60C 23/00
[52] U.S. Cl. ........................................ 152/415; 137/223
[58] Field of Search ............................ 152/415; 137/223

[56] References Cited

U.S. PATENT DOCUMENTS

| | | | |
|---|---|---|---|
| 1,918,689 | 7/1933 | Crowley | 137/223 |
| 3,786,994 | 1/1974 | Kukes et al. | 239/569 |
| 4,798,233 | 1/1989 | Mooney | 152/415 X |
| 4,807,658 | 2/1989 | Patti | 152/415 X |

*Primary Examiner*—Francis J. Lorin
*Attorney, Agent, or Firm*—Charles I. Brodsky

[57] ABSTRACT

A portable tire valve extension is disclosed which is capable of enabling the inflation of an inner tire while it remains mounted to a second outer tire, as is often the case with many trucks, buses, recreational vehicles, and motor homes. A cylinder including an air valve (of identical size, shape, and configuration as is traditionally used on a tire) is located at one end of the cylinder, and an air valve (of identical size, shape, and configuration as is traditionally used on an air pump) is located at a second end. In a preferred embodiment, the cylinder is of approximately 12 inches in length and ¼ inch in diameter, so as to allow it to fit through the rim of the outer tire to access the inner tire valve.

5 Claims, 2 Drawing Sheets

PORTABLE TIRE AIR VALVE EXTENDER FOR USE WITH STACKED WHEEL SETS

FIELD OF THE INVENTION

This invention relates to the inflation of a tire mounted to the inside of a second tire(stacked tires). More particularly, it relates to an extension cylinder of such dimension to permit access to the inner tire while the outer tire is still mounted, using traditional junctions which allow air pumps/compressors and portable canisters available at homes and filling stations, and which are not otherwise equipped to add air to the inner tire of stacked tired vehicles.

BACKGROUND OF THE INVENTION

As is well known, vehicles that transport heavy payloads often require stacked tire arrangements to support and distribute the weight. Vehicles to which these arrangements can often be found include trucks, motor homes, buses and recreational vehicles. The wear and tear caused by the heavy loads increases the frequency with which air needs to be added to the tires of the vehicles.

It is often desirable to be able to add air to the inner tire of a stacked tire set without having to remove the outer tire to gain access to it. In these instances, the driver presently is required to find a service station specially equipped with air pumps designed to handle such vehicles. These kinds of service stations are typically known as truck stops, and are usually found on interstates and toll roads. The inconvenience of having to drive miles out of one's way, and possibly having to pay a toll for the privilege of not having to remove the outer tire, negates much of the benefit of not having to remove the outer tire to begin with. In addition, "do-it-yourself" tire inflation/repair products that come in a canister, such as FIX-A-FLAT, cannot be used with the outer tire mounted to get a disabled vehicle to a service station for proper tire repair.

It will thus be appreciated that it would be highly desirable if a lightweight, inexpensive, portable extension cylinder were available to owners of vehicles having stacked wheel sets so that they could access the air valve on the inner tire, without having to remove the outer one.

SUMMARY OF THE INVENTION

As will be seen from the following description, this invention generally relates to the ability to add air to the inner tire of a stacked wheel set while both tires are still mounted on the vehicle, by employing an extension that is temporarily engaged between the tire valve, and the air pump/compressor or portable canister, and then stored back within the vehicle. In such manner, the operator of a vehicle having stacked wheel sets can add air to the inner tire without having to remove the outer tire or travel to a specially equipped service station.

As will become clear from the description below, the present invention can be used to connect any air compressor/pump, or canister to any make, age, or model tire so long as the outer tire's rim openings are aligned to permit access to the inner tire's valve, as is the norm,

BRIEF DESCRIPTION OF THE DRAWINGS

These and other features of the invention will be more clearly understood from a consideration of the following description, taken in connection with the accompanying drawings, in which.

DETAILED DESCRIPTION OF THE DRAWING

Figure 1:
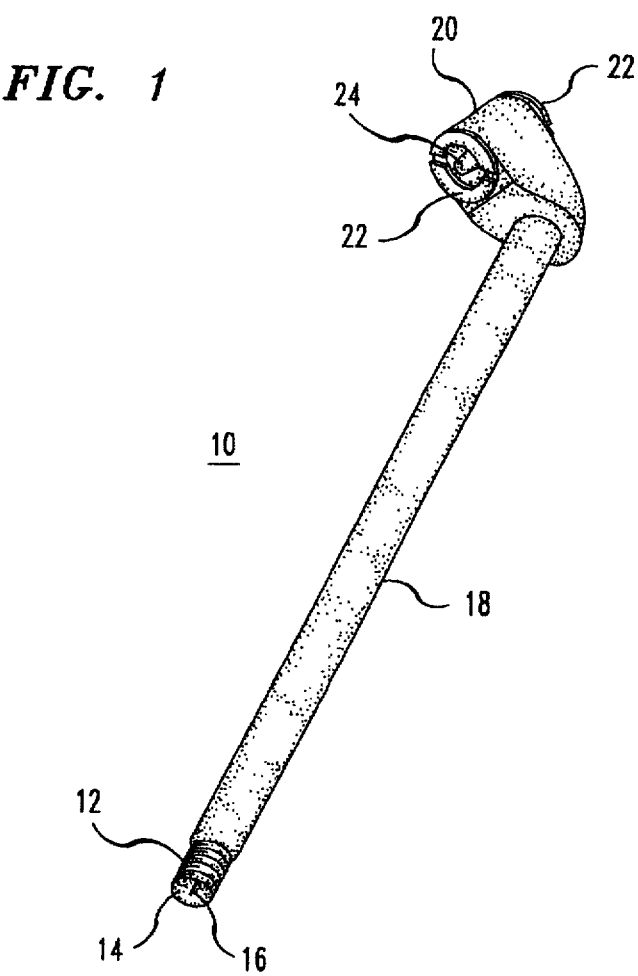
FIG. 1 is a perspective view of an air valve extender embodying the invention.

In FIG. 1 the air valve extender 10 is shown as consisting of a threaded terminus 12, having an approximate outer diameter of ¼ inch—identical to that of air valves employed on inner tubes and tires—and a central cavity 14 of slightly lesser diameter. A valve pin 16, located within the central cavity 14, is employed to open the cavity so that air can pass from the threaded terminus 12 into a cylinder 18, approximately some 12 inches long. The central cavity 14 extends centrally from the threaded terminus 12—maintaining a constant diameter—through the cylinder 18, and a head 20. The head 20 contains a pair of air valve couplers 22, and is of a standard design, size, and type used in conjunction with filling tires with air. Within each air valve coupler 22 is a fixed projection 24 that engages the valve pin found within a valve stem on a tire, thereby allowing air to pass therein. The threaded terminus 12, the cylinder 18 and the head 20 may each be constructed of brass.

Figure 2:
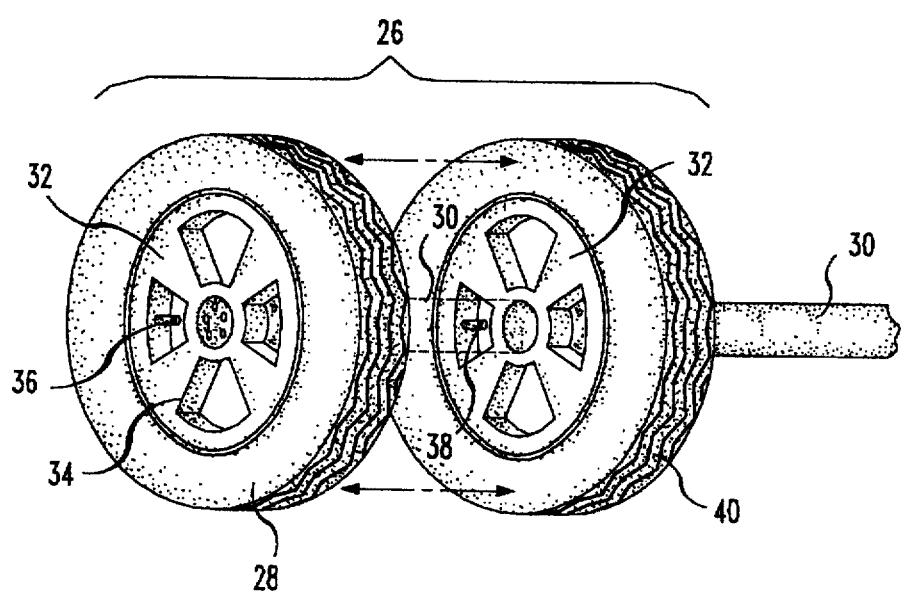
FIG. 2 is a perspective view of a stacked wheel set helpful in an understanding of the present invention.

FIG. 2 shows a stacked wheel tire set 26, comprising an inner tire 40 and an outer tire 28, which are mounted at the end of a single axle 30. The tires 26 are mounted on a pair of rims 32 that are specifically designed for this use. The rims 32 have a plurality of apertures 34 that permit airflow to the brakes during operation, and access to both the outer valve stem 36 and the inner valve stem 38 of the tires. The valve stems 36 and 38 are of the standard design employed on all tires, and identical to the threaded terminus 12 of the valve extender 10.

As will be appreciated, when two tires are stacked in such a manner, the valve stem 38 of the inner tire 40 is significantly concealed by the outer rim 32, as well as being a further reach under the vehicle. The apertures 34 are typically of a size and shape so as to interfere with the insertion of a hand, air compressor, canister, or pump to enable a union with the inner valve stem 38. As a result, either the outer tire 28 needs to be removed—a laborious task—or a service station specially outfitted for servicing stacked wheeled vehicles needs to be reached. Neither option is time or cost effective. The valve extender 10 of the invention, however, permits the owner or operator of a vehicle having stacked wheels to add air to the inner tire 40, without having to remove the outer tire 28.

Figure 3:
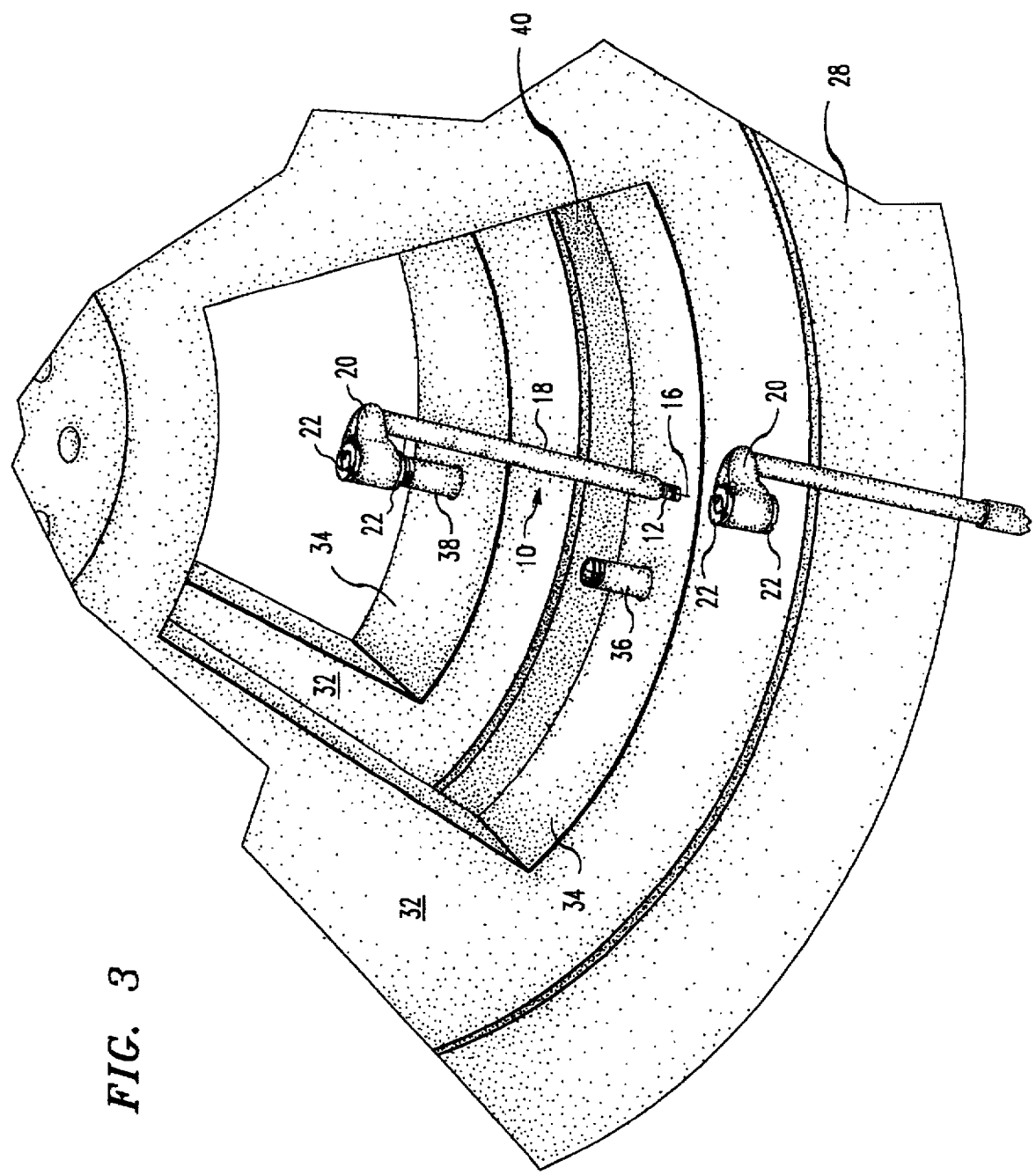
FIG. 3 is a perspective view helpful in understanding the usage of the invention.

As shown in FIG. 3, the user merely inserts the valve extender 10, through the aperture 34 to access the inner valve stem 38, and presses the air valve coupler 22 over the inner valve stem 38 so that the fixed projection 24 contacts its valve pin, thereby opening the air valve. An air pump/compressor or canister having a standard head 20 would then be press fit, or screwed over the threaded terminus 12, until the valve pin 16 is engaged, thereby causing the valve to open and permit air to pass through the central cavity 14, through the cylinder 18, through the valve stem 38 and into the inner tire 40 adding to its contents. In this respect, it will be understood that the valve pin 16 is spring-biased outwardly to a quiescently closed position until such time as it is engaged, to be thereby displaced inwardly, to open the valve and allow the air flow.

While there has been described what is considered to be a preferred embodiment of the present invention, it will be readily appreciated by those skilled in the art that modifications can be made without departing from the scope of the teachings herein. Thus, whereas, the valve extender of the invention has been described in the context of a length of 12 inches, and a diameter of ¼ inch, other dimensions might be preferable for use with different tire widths and/or rim apertures. For at least such reasons, therefore, resort should be had to the claims appended hereto for a true understanding of the scope of the invention.

I claim:

1. A portable air valve extender tool which is carried about by a user to enable the fitting on an air pump/compressor or canister to add air to that inner tire on a vehicle having stacked wheels which is in need of air, without having to first remove the outer tire of said stacked wheels, comprising:

a threaded terminus having a valve actuated by a protruding pin;

a cylinder extending from said threaded terminus and having a central cavity at a first end thereof accessed by the opening of said valve; and a head connected to a second, opposite end of said cylinder, having a coupling means designed to fit over an air valve stem;

wherein said threaded terminus is of dimension and workings to co-operate with said fitting on said air pump/compressor or canister in delivering air;

wherein said cylinder is of a length to pass through said outer tire to access said air valve stem of said inner tire of said stacked wheels and said cylinder is constructed of substantially inflexible material; and wherein said head has a pair of air valve stem couplers of opposing sides thereof for fitting over said air valve stem by either a pulling or pushing motion dependent upon the physical orientation of said stem on said inner tire.

2. The portable air valve extender tool of claim 1 for use with an air valve stem fitting, wherein said cylinder is of a diameter substantially equal to that of said air valve stem.

3. The portable air valve extender tool of claim 1 wherein said air valve stem coupler is of a dimension and workings to cooperate with said air valve stem in adding air to said inner tire.

4. The portable air valve extender tool of claim 1 wherein said threaded terminus, cylinder, and head are constructed of brass.

5. The portable air valve extender tool of claim 1 wherein said cylinder is substantially 12 inches in length.

* * * * *